Jan. 7, 1964 J. MacKENZIE 3,116,682
DRAINAGE CONTAINER
Filed May 17, 1961 2 Sheets-Sheet 1

INVENTOR.
John Mackenzie
BY
attorney

Jan. 7, 1964    J. MacKENZIE    3,116,682
DRAINAGE CONTAINER
Filed May 17, 1961    2 Sheets-Sheet 2

INVENTOR.
John Mackenzie
BY
Karon W. Flocks
Attorney

3,116,682
DRAINAGE CONTAINER
John Mackenzie, Van Riebeeck Drive, Huguenot,
Republic of South Africa
Filed May 17, 1961, Ser. No. 110,752
Claims priority, application South Africa June 3, 1960
9 Claims. (Cl. 100—112)

This invention relates to apparatus suitable for the extraction of liquids from solids, for example, the extraction of juice from vegetable matter such as grapes, or of liquids from fish during the making of fish meal.

According to the invention a liquids and solids separator comprises a pressure-tight vessel having a charging opening and a hopper-shaped lower end having a discharge opening and closing means to close it, a removable liquids-permeable partition in the hopper-shaped lower end and above the discharge opening, a shaft in the vessel extending upwardly from the permeable partition and extending through a gland provided in the wall of the vessel, a conveyor screw blade provided on the shaft, drive means connected to the shaft outside the vessel for driving the shaft in rotary fashion, and pressure differential means to subject the inside of the vessel and its contents to a pressure different from atmospheric pressure.

The pressure differential means may comprise charging means for charging the separator under pressure with liquids and solids to be treated, and there may be provided an over-pressure relief valve out of the vessel, and an under-pressure relief valve into the vessel. The pressure differential means may comprise further, a pressure conduit connection into the vessel at a level above the permeable partition, and pressure connecting means for connecting the pressure conduit connection to a supply of fluid under pressure for subjecting the vessel to a pressure greater than atmospheric pressure, and if desired a suction conduit connection into the vessel at a level below the permeable partition, and suction connecting means for connecting the suction conduit connection to exhausting means such as an exhaust pump for reducing the pressure inside the vessel to a value below atmospheric pressure.

The lower end of the screw conveyor is preferably shod with a resilient material which is arranged to rotate in contact with the permeable partition to prevent clogging of the partition.

A separator may further include heating means for heating the separator and its contents, and the heating means may include a steam jacket around the vessel which may have a steam inlet opening and a steam-condensate outlet opening, and means for connecting a supply of steam to the steam inlet opening. Furthermore, the conveyor shaft may be hollow and there may be provided means for connecting the upper end of the shaft through a gland to a steam supply, and a banjo-type connection and gland around the lower end of the shaft to provide a steam and condensate outlet out of the shaft, whereby the hollow shaft and conveyor screw blade may also be heated by steam.

Further features of the invention will become apparent from the following description of specific embodiments with reference to the accompanying diagrammatic drawings.

In the drawings

Figure 1:
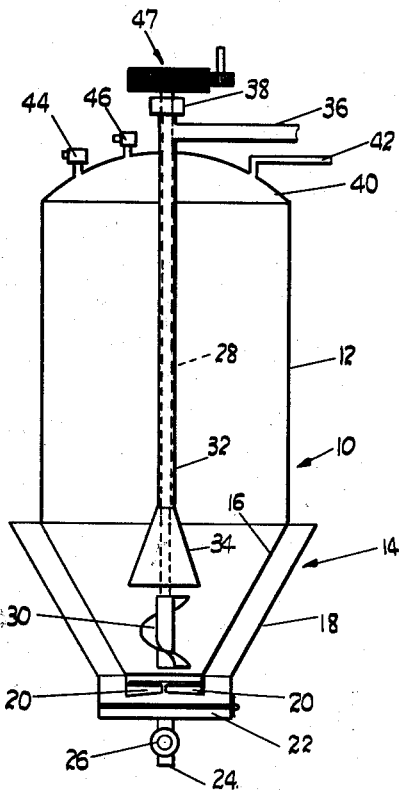
FIGURE 1 shows a sectional side elevation of one embodiment of the invention.
Figure 2:
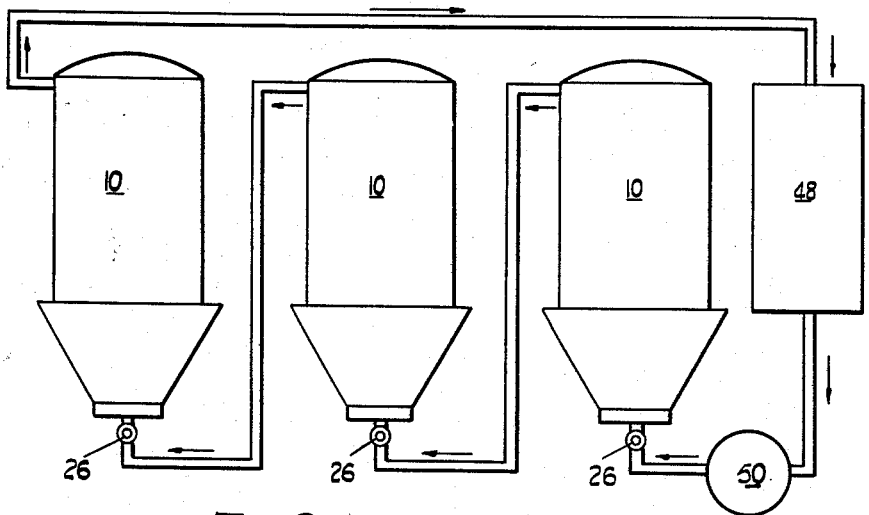
FIGURE 2 shows a plurality of separators arranged in series with a circulating pump.

Referring to FIGURES 1 and 2 of the drawings, reference numeral 10 refers generally to a pressure-tight vessel having an upper round cylindrical portion 12 and a lower hopper-shaped portion 14 having permeable wall 16 spaced inwardly from the outer wall 18 and having a pair of liquids-permeable swing flap doors 20 at the lower open end of the inner wall 16. At the bottom of outer wall 18 there is provided a hinged door 22 adapted to coact with the wall 18 in pressure-tight fashion. The door 22 is provided with outlet pipe 24 and stop valve 26. If desired an exhaust pump may be connected to pipe 24 either directly or through a vacuum tank via a branch pipe and stop valve not shown.

Inside the vessel there is provided shaft 28 extending upwardly from the swing doors 20 and mounted to rotate about its axis. At its lower end there is provided a conveyor screw blade 30. Feed pipe 32 is concentric with shaft 28 and has a bell-mouth lower discharge end 34 and an upper inlet end 36. A gland 38 coacts sealingly with shaft 28 which is provided with drive means to rotate it.

The upper part of the vessel is defined by an upper dome portion 40 and has a connection 42 whereby gaseous fluid under pressure may be admitted into the vessel. Also provided on this upper dome portion is a pressure release or safety valve 44 and an inwardly opening vacuum release valve 46. The shaft 28 is driven by drive means generally designated by reference numeral 47.

The operation of this embodiment of the invention will now be described. Assuming that crushed grapes is the pulpy material from which the juices are to be extracted, the operation of the apparatus is as follows:

First of all, door 22 is opened or removed and flap door 20 closed. The crushed grapes are then pumped under pressure by a pump (not shown) through the feed pipe 32 by way of the inlet end 36. They fill up the lower part of the pervious hopper-like wall 16. At first the liquid draining off and passing through flap doors 20 and the covered portion of the sloping wall 16 may contain a large percentage of solids in suspension and will continue to do so until a sufficient quantity of crushed grapes has been pumped in to form a bed or mat at the bottom end part of the sloping wall 16. When a layer of grape pulp of sufficient depth has been built up, the liquid in the incoming grape pulp will have to percolate through this layer which then acts as a filtering medium and filters out most of the suspended solids in the liquid which is then separated in a purified form and is collected in a suitable receptacle placed below the bottom discharge opening in impervious wall 18 or is led off via pipe 24 to wherever required.

As the forced introduction of the grape pulp continues, its level rises in the lower hopper shaped part 16, until the bell-mouth end 34 of the feed pipe 32 is submerged. Further charging then causes the newly introduced grape pulp to be deflected downwardly under the existing mass of material, thereby allowing the liquid therefrom to percolate through this existing mass acting as a filter bed, and displacing the portion of the drier mass of material, thereby causing it to rise upwardly. The bell-mouth end 34 allows the incoming pulp to be spread evenly inside the container. Further forced introduction of fresh grape pulp will cause the displaced drier pulp to rise further until it enters the cylindrical part of the container, the walls of which are of impervious material. Continued rising of the displaced pulp in this manner will compress the trapped air in the upper part of the container which air will then flow downwardly through the pulp mass and in doing so will assist in the liquid separation process.

If the air pressure exceeds a predetermined value, some of it will escape by way of the pressure release valve 44. If the pressure is required to be increased, then additional air or other suitable gaseous fluid under pressure may be introduced by way of the air inlet pipe 42.

When the liquid separation process is complete, the spent material is discharged by gravity after the flap doors 20 have been opened. If sub-atmospheric pressure results in the top part of the container during the discharging operation, the vacuum release valve 46 will open to limit the pressure difference.

If difficulty is experienced in getting the spent material to discharge by gravity, this can be assisted by applying air pressure by way of the inlet pipe 42, or by rotating the worm screw 30 in the appropriate direction by means of the shaft 28. The worm screw 30 can also be used during the separation process, to loosen the mass of material forming the filter bed at the lower part of the pervious sloping wall 16, if it becomes clogged.

In addition to the method of use above described, the apparatus can be used for separation of the liquid content of a pulpy material such as crushed grapes by fermentation as follows:

When it is considered that sufficient liquid has been extracted by the process described above, the door 22 is closed thus enclosing the interior space of the container in a pressure or air-tight manner. The pulp is then allowed to ferment and the gas generated during fermentation then rises upwardly through the mass of material and remaining liquid and carries with it the suspended solids, thereby allowing the purer liquid to accumulate at the bottom of the chamber. Any excess gas pressure is relieved by opening of the vacuum release valve 46. This gas can be collected and utilized if desired.

According to a further use to which the apparatus as above described may be put, separation or extraction of the desired liquid content may be effected by a leaching process.

Assuming that, as before, crushed grapes is the material from which the liquid content is to be extracted, the process is carried out as follows with reference to FIGURE 2. After fermentation has taken place according to the process described above and the liquid drained off, the remaining mass of solids instead of being discharged, is treated with a leaching liquid to remove the last remaining useful constituents from this mass.

Preferably a plurality of containers 10 are arranged in a battery as shown in FIGURE 2, and are connected in series with a reservoir tank 48 and circulating pump 50 by connecting piping as shown so as to form a closed circuit. The flow of the leaching liquid is in the directions indicated by the arrows.

A suitable leaching liquid, when the material being treated is crushed grapes, can be a low quality wine, spent wash or water.

As the leaching liquid passes up through the pulp masses in each container, an osmotic action takes place whereby the last remaining useful constituents of the pulp mass are extracted. The liquid is circulated until the extraction process is completed when it is run off from the system by way of the stop valves 26 after disconnecting the piping or providing additional stop valves in the piping for this purpose.

Although FIGURE 2 shows the containers connected in series, the invention can also be carried out with a plurality of containers connected in parallel. Arrangements may also be made to reverse the direction of flow of the leaching liquid.

Figure 3:
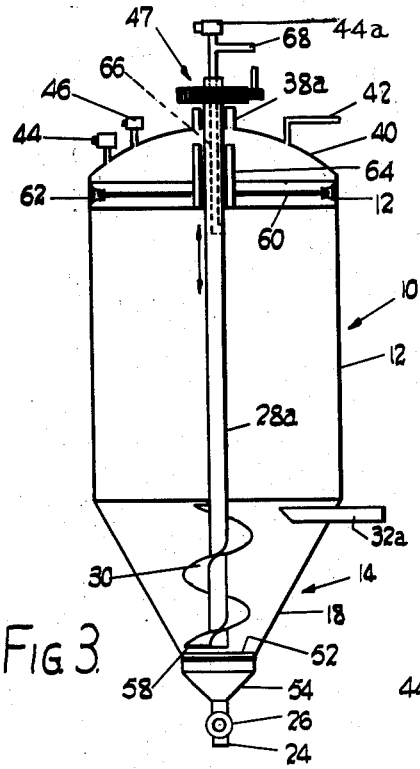
FIGURE 3 shows a sectional side elevation of another embodiment of the invention.
Figure 4:
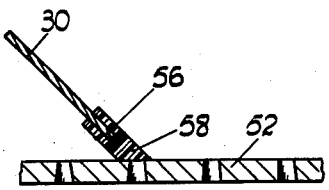
FIGURE 4 shows a detail of the lower end of the conveyor screw blade.

Referring to FIGURES 3 and 4 of the drawings, there is shown another embodiment of the invention having some variations in construction.

The vessel 10 is pressure-tight as before but is provided with a removable liquids-permeable partition or grid structure 52 at the lower discharge end of the wall 18. Below grid structure 52 there is provided a small collecting hopper 54 to which is connected outlet pipe 24 and stop valve 26. As with the previous embodiment, an exhaust pump may be connected to pipe 24 either directly or through a vacuum tank, via a branch pipe and stop valve. The shaft 28a passes through gland 38a in domed top 40, and is also driven by drive means 47.

The feed pipe 32a now enters the vessel at a level below the cylindrical part 12. The lower end 56 of conveyor screw blade 30 is shod with a wiper 58 of resilient material (see FIG. 4). The wiper is arranged to slide in contact with the grid 52 to prevent or overcome blockage thereof by compacted fibrous or other solid matter.

Slidably located in the upper cylindrical part 12 of the vessel, is a piston element 60 provided around its periphery with a resilient sealing ring 62. The boss 64 of this piston element 60 engages slidably and sealingly with the shaft 28a which is counterbored downwardly from its top exteriorly projecting end, to provide a passage 66 by means of which air pressure or a vacuum may be applied to the underside of the piston element 60 when it is in its elevated position as shown in the drawing.

A pipe 68 is connected to the passage 66 by a T-connection the other leg of which is connected to an adjustable pressure relief valve 44a. A further adjustable pressure relief valve 44 fitted to domed top 40 communicates with the space above the piston element 60, to which space pressure air or other suitable gaseous fluid under pressure is arranged to be admitted by way of the pipe 42 so as to cause such piston element 60 to slide downwardly.

With the piston element 60 in "Down" position, crushed grapes or other pulpy material is pumped into the vessel 10 under pressure by way of the feed pipe 32a. The hopper part 14 is rapidly filled and any free liquid in the mass runs off through the grid structure 52 into the collecting hopper 54 and out by way of the pipe 24. It will be understood that the mass of pulp which collects in the hopper part 14, acts as a filter medium through which liquid from the pulpy mass percolates.

Further pumping of pulpy material into the vessel 10, will compress air trapped between the top surface of the mass of material in the hopper part 14 and the underside of the piston element 60, and in time will cause it to slide upwardly. During this movement the air trapped above the piston element will be forced out by way of the pressure relief valve 44 which is set to open at a predetermined pressure. When the cylindrical section is filled and the piston is at its topmost position air or a gas is introduced under pressure to the lower side of the piston through pipe 68 via passage 66. This air or gas pressure is held at a predetermined pressure forcing the remaining free liquid downwards until the air or gas blows through the perforations in the grid 52. The air or gas under pressure below the piston element 60, acts on the free liquid in the mass of material in the lower part of the vessel 10, and forces it downwardly and through the grid structure 52.

When all the free liquid has been removed in this manner, the pulpy mass is then crushed to extract more liquid. This may be done by introducing air or some other suitable gaseous fluid under pressure through the pipe 42 into the space above the piston element 60, which, acting on it, forces it downwardly onto the top of the pulpy mass and compresses it to express more liquid which percolates downwardly into the collecting hopper 54. At the same time the worm is rotated in such a direction that the wiper 58 forms the leading edge of the lower end 56 of the screw blade 30. The wiper 58 thus keeps the perforations in grid plate 52 clean thus allowing the liquid to be forced downwards to escape through grid plate 52.

If the pulpy mass becomes caked and impervious through this application of pressure so as to interfere with the percolation of liquid through it, such mass can be loosened, by reversing the rotation of the screw and/or by applying vacuum or sub-atmospheric pressure to the top side of the piston element 60 by way of the pipe 42. This will cause the piston element 60 to rise which in turn will cause a partial vacuum to be created on its underside, whereby the caked mass of compressed material will likewise be raised. This action will tend to loosen the caked mass until air enters the chamber through the grid structure 52 and by destroying the partial vacuum, permits it to fall back. These operations may be repeated until substantially all the liquid such as grape juice, has been extracted from the mass.

To discharge the residual mass of material which will be mostly fibrous in form, the collecting hopper 54 together with the grid structure 52 is detached so as to leave the bottom end of the hopper part 14 open. The shaft 28a is then rotated in a direction which, by means of the worm screw 30, will cause this residual mass of material to be discharged through the bottom opening of the hopper 14.

For types of pulp which have large solids and require quicker drainage, the hopper 14 may be provided with an inner slotted or perforated wall such as 16 in FIGURE 1, to act as additional sieving means.

Figure 5:
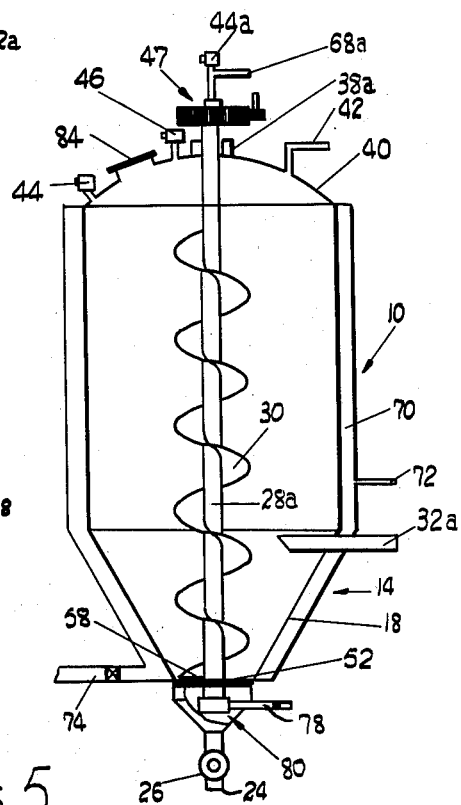
FIGURE 5 shows a sectional side elevation of yet a further embodiment of the invention.
Figure 6:
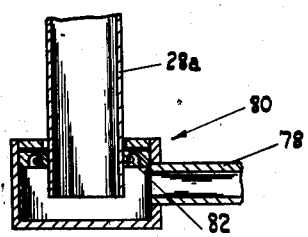
FIGURE 6 shows a detail of a banjo-type connection and gland at the lower end of the hollow conveyor screw shaft.

Referring to FIGURES 5 and 6 of the drawings, there is shown a separator, similar to those already described but suitable for use in the fishing industry for the preparation of fish meal. It will be noted that the screw blade 30 extends the full length of the shaft 28a. Furthermore there is provided a steam jacket 70 around the vessel 10 for heating it and having a steam inlet opening 72 and a steam condensate outlet opening 74. If desired the shaft 28a may be hollow for heating, and may also be arranged to have a steam inlet 68a, and a steam condensate outlet 78, via banjo type connection 80 and seal 82 at the lower end of hollow shaft 28a. In addition there is provided a manhole with cover 84 in case it is desired to charge the vessel via the manhole. The lower end 56 of screw blade 30 is also shod with wiper 58 of resilient material.

The functioning of the device is very much the same as previously described except that it now functions as a digester as well. The stick water is drawn off via outlet pipe 24 while the solid fish residue remains behind in the vessel for later discharge after withdrawal of collecting hopper 54 and grid plate 52.

I claim:
1. A liquids and solids separator which includes
   (a) a pressure-tight vessel having
      (i) a charging opening,
      (ii) a downwardly converging lower part having a discharge opening at its lower end,
      (iii) a removable liquids permeable partition at the bottom of the downwardly converging lower part and across the discharge opening, the partition being removable downwardly from said pressure-tight vessel to permit the discharge of solids from the downwardly converging lower part; and
      (iv) a liquids drain outlet below the partition,
   (b) a shaft in the vessel and extending upwardly from the partition,
   (c) a conveyor screw blade provided on the shaft, and
   (d) drive means at the upper end of the shaft for driving it in rotary fashion.
2. A separator according to claim 1 in which
   (a) the vessel is a pressure vessel and has an upper part which is round cylindrical and which is coaxial with the shaft,
   (b) the shaft has its conveyor screw blade only along its lower length and within the downwardly converging lower part of the vessel,
   (c) there are provided
      (i) a plunger coaxial with the shaft and axially slidably sealingly displaceable within the upper part of the vessel between upper and lower limiting positions corresponding to the upper and lower ends of the cylindrical upper part,
      (ii) a pressure feed pipe at a level below the lower limiting position of the plunger and passing transversely into the vessel,
      (iii) a gland around the upper end of the shaft,
      (iv) a pressure limit relief valve and an inwardly opening vacuum release valve out of the space in the vessel above the plunger, and
      (v) pressure and suction conduit connections into the space above the plunger, whereby the said space may be subjected to a pressure greater or less than atmospheric pressure as desired.
3. A separator according to claim 2 in which there is provided pressure relief means out of the space below the plunger when the plunger is in its upper limiting position, and comprising a pressure relief valve and a passage down the shaft, in communication with the valve, the passage having a transverse opening into the vessel at a level below the upper limiting position of the plunger.
4. A separator according to claim 1 in which the liquids permeable partition comprises a pair of outwardly hinged inwardly closing coacting doors.
5. A separator according to claim 1 in which
   (a) the lower end of the screw conveyor is shod with a resilient material which is arranged to rotate in contact with the permeable partition to prevent clogging of the partition, and
   (b) the permeability of the permeable partition is provided by openings diverging downwardly.
6. A separator according to claim 1 in which there is provided a pervious lining within the downwardly converging lower part of the vessel and spaced away from it and extending upwardly from the liquids permeable partition; a clearance space for liquid run-off being defined between the pervious lining and the downwardly converging lower part of the vessel.
7. A separator according to claim 1 in which the vessel includes
   (a) a gland around the upper end of the shaft, and below the drive means,
   (b) a pressure feed pipe near the lower end of the vessel and passing transversely into it, the outlet opening of the feed pipe being the charging opening into the vessel, and
   (c) gaseous pressure relief means at the upper end of the vessel.
8. A liquids and solids separator which includes
   (a) a pressure-tight vessel having
      (i) a charging opening,
      (ii) a downwardly converging lower part having a discharge opening at its lower end,
      (iii) a removable liquids permeable partition in the downwardly converging lower part and across the discharge opening and comprising at least one hinged door; and
      (iv) a liquids drain outlet below the partition,
   (b) a shaft in the vessel and extending upwardly from the partition,
   (c) a conveyor screw blade provided on the shaft,
   (d) drive means at the upper end of the shaft for driving it in rotary fashion, and
   (e) a feed pipe around the shaft and extending downwardly for at least part of the length of the shaft, the feed pipe having an upper side inlet opening below the drive means, and the lower end of the feed pipe being the charging opening into the vessel.
9. A separator according to claim 8 in which
   (a) the screw conveyor is provided along only the lower end of the shaft,
   (b) the lower part of the feed pipe is a downwardly extending bell-mouthed pipe,

(c) the feed pipe has a transverse limb below the drive means and connection means for connection to feed means adapted to feed liquids and solids under pressure into the feed pipe, the transverse limb being the side inlet into the feed pipe, (d) there is provided a gland around the shaft and above the transverse limb of the feed pipe.

References Cited in the file of this patent

UNITED STATES PATENTS

| | | |
|---|---|---|
| 577,448 | Patersen | Feb. 23, 1897 |
| 649,490 | Selg | May 15, 1900 |
| 751,810 | Rice | Feb. 9, 1904 |
| 1,686,715 | Smith | Oct. 9, 1928 |
| 2,181,838 | Tressler | Nov. 28, 1939 |
| 2,452,612 | Swenberg | Nov. 2, 1948 |
| 2,536,993 | Cremaschi | Jan. 2, 1951 |

FOREIGN PATENTS

| | | |
|---|---|---|
| 592,834 | Great Britain | Sept. 30, 1947 |